E. M. CASKEY.
TANK.
APPLICATION FILED NOV. 4, 1911.

1,157,675.

Patented Oct. 26, 1915.

Witnesses:
G. W. Bmarus Jr.
R. Burkhardt.

Inventor:
Edgar M. Caskey
By
Att'ys

UNITED STATES PATENT OFFICE.

EDGAR M. CASKEY, OF CHICAGO, ILLINOIS, ASSIGNOR TO S. F. BOWSER & CO., INC., OF FORT WAYNE, INDIANA, A CORPORATION OF INDIANA.

TANK.

1,157,675.  Specification of Letters Patent.  Patented Oct. 26, 1915.

Application filed November 4, 1911. Serial No. 658,579.

*To all whom it may concern:*

Be it known that I, EDGAR M. CASKEY, a citizen of the United States, residing at Chicago, in the county of Cook and State of Illinois, have invented certain new and useful Improvements in Tanks, of which the following is a specification.

This invention relates to tanks for oil storage, and the like, and more particularly to those positioned below the surface of the ground.

The principal object of the invention is to provide means to permit and induce a draft through a tank positioned below the surface of the ground.

A further object is to provide an improved, simple and inexpensive tank of the class and for the purpose described.

For the attainment of these ends and the accomplishment of other new and useful objects, as will appear, the invention consists in the features of novelty in the construction and arrangement thereof, generally shown in the accompanying drawing and described in the specification, but more particularly pointed out in the appended claims.

Figure 1:
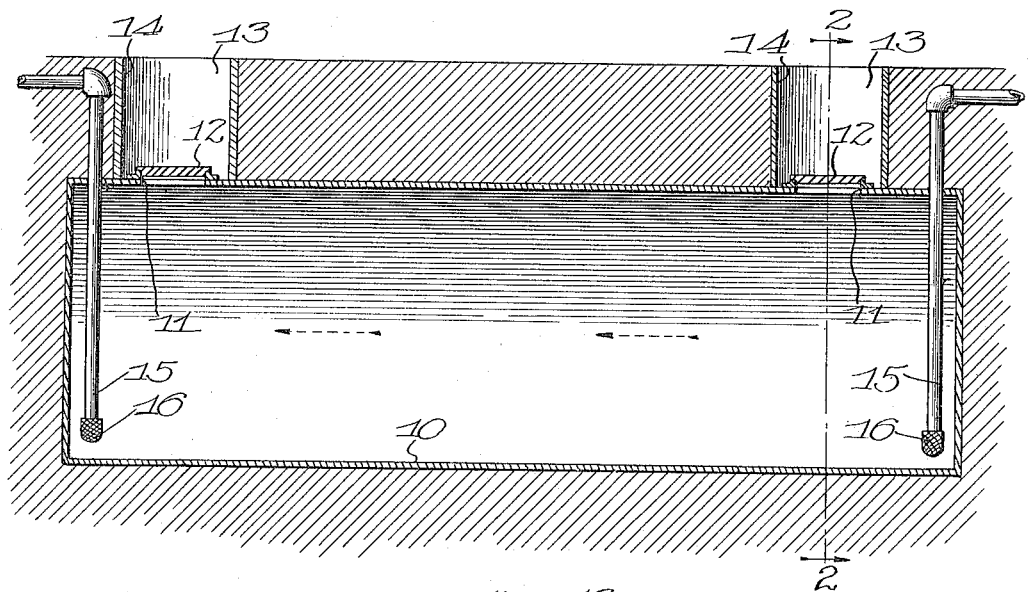
Figure 2:
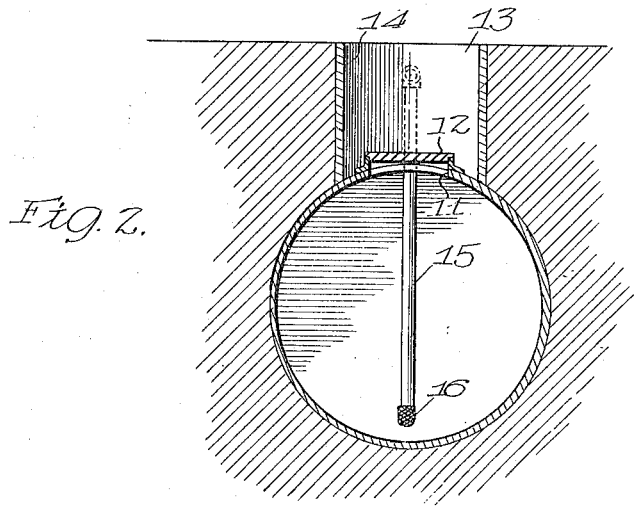

In the drawing, Figure 1 is a sectional view of a tank constructed in accordance with the principles of the invention and disposed below the surface of the ground; Fig. 2 is a cross sectional view of the same upon the line 2—2, of Fig. 1.

It has frequently happened, in practice, that when a tank of the type ordinarily employed for holding oils, is to be cleaned, the gases contained in the tank or arising from the oil or residum, are so noxious as to endanger the life of the person who cleans the tank. In fact there are numerous cases where the poisonous fumes have caused the death of persons cleaning the tanks. The introduction of lighted or heating devices is apt to produce an explosion, and blowing devices are not always at hand for driving the gases from the tank. The tanks ordinarily employed are provided with a single manhole, which prevents the circulation of air through the tank when the manhole is open.

The purpose of the applicant is to provide a construction in which a tank disposed below the surface of the ground, may have a draft induced through the tank to clear it of the poisonous gases, whereby the tank will be rendered safe for a person in cleaning the tank.

Referring more particularly to the drawing and in the present exemplification of the invention, the reference numeral 10 designates a tank constructed of any suitable material, preferably greater in length in one direction than in another, usually cylindrical in shape, and disposed below the surface of the ground. This tank is provided with manholes 11 preferably disposed adjacent each end of the tank and in the upper or top surface thereof. Fitting the manholes 11 are removable covers 12, and extending downwardly from the surface of the ground to the top of the tank adjacent the manholes, are passages 13 which may be provided with suitable linings 14 to prevent the earth from caving in. Means are usually provided for filling and emptying the tank comprising the pipes 15 with the strainers 16 at the ends thereof and disposed adjacent the bottom of the tank.

To induce a circulation of air through the tank, it is necessary only to remove the manhole covers 12 from the manholes, whereupon the air passing over the surface of the ground will induce a circulation or draft through the tank which will drive out the poisonous or foul gases from the tank and produce a circulation of pure air through the tank. This will render the tank fit for occupancy whereupon it may be cleaned without the introduction of artificial means, such as heat or blowers, to introduce a circulation of pure air in the tank.

While I have thus described the preferred disposition and embodiment of my invention, it is evident that those skilled in the arts to which this appertains, may make various changes therein without departing from the spirit and scope of the invention.

What I claim is:

1. The combination of a tank for fluids adapted to be buried beneath the surface of the ground and having openings in the uppermost surface of the tank communicating with the outer air at the same level to induce a draft through the tank from one opening to the other when air is in motion over the tank openings, and an independently removable closure for each opening to shut off the circulation of air through the tank.

2. The combination with a closed tank for containing fluids adapted to be buried beneath the surface of the ground and having an opening in the uppermost side at each end, a closure for each opening, and means forming a passage to the top of the ground with the top of the passages in the same plane so that a current of air passing over the ground and over the passages when the closures are removed will cause a circulation of air through the tank in a direction opposite to that in which the air is moving above the ground for freeing the tank from noxious vapors.

3. A closed horizontally disposed tank adapted to be buried beneath the surface of the ground, having a single opening in the uppermost side at each end with a passage communicating therewith extending to the surface of the ground, and normally closed covers for the tank openings removable therefrom to induce a draft through the tank when a current of air passes over the surface of the ground above the passages.

In testimony whereof I have signed my name to this specification, in the presence of two subscribing witnesses, on this first day of November A. D. 1911.

EDGAR M. CASKEY.

Witnesses:
K. W. WORMELL,
C. H. SEEM.

Copies of this patent may be obtained for five cents each, by addressing the "Commissioner of Patents, Washington, D. C."